(12) United States Patent
Duernegger et al.

(10) Patent No.: US 12,533,768 B2
(45) Date of Patent: Jan. 27, 2026

(54) POWER TOOL

(71) Applicant: C. & E. FEIN GMBH, Schwäbisch Gmünd-Bargau (DE)

(72) Inventors: Wolfgang Duernegger, Schorndorf (DE); Tobias Hokenmaier, Rechberghausen (DE)

(73) Assignee: C. & E. FEIN GMBH, Schwäbisch Gmünd-Bargau (DE)

( * ) Notice: Subject to any disclaimer, the term of this patent is extended or adjusted under 35 U.S.C. 154(b) by 614 days.

(21) Appl. No.: 17/351,942

(22) Filed: Jun. 18, 2021

(65) Prior Publication Data
US 2021/0394329 A1 Dec. 23, 2021

(30) Foreign Application Priority Data

Jun. 18, 2020 (DE) .......................... 202020103534.7

(51) Int. Cl.
*B24B 23/02* (2006.01)

(52) U.S. Cl.
CPC .................. *B24B 23/028* (2013.01)

(58) Field of Classification Search
CPC ......... B24B 23/02; B24B 47/26; B24B 27/08; B24B 55/02; B24B 55/052; B24B 27/26; H01H 3/20; H01H 9/20; H01H 9/22; H01H 9/223; H01H 9/226; H01H 21/06; H01H 21/10; H01H 2221/052
USPC .......................... 200/50.1, 43.1, 43.11, 43.13, 200/43.16–43.21, 50.02, 50.11, 318, 321, 200/322
See application file for complete search history.

(56) References Cited

U.S. PATENT DOCUMENTS

| 6,065,912 A * | 5/2000 | Bosten ...................... B27C 5/10 |
| | | 409/134 |
| 2014/0338947 A1* | 11/2014 | Boeck ...................... B25F 5/02 |
| | | 200/43.17 |

(Continued)

FOREIGN PATENT DOCUMENTS

| DE | 19958297 | 6/2000 |
| DE | 10254275 | 7/2003 |

(Continued)

OTHER PUBLICATIONS

Search Report with machine translation for German Patent Application No. 202020103534.7, dated Feb. 26, 2021, 5 pages.

*Primary Examiner* — David S Posigian
*Assistant Examiner* — Tyler James Mcfarland
(74) *Attorney, Agent, or Firm* — Sheridan Ross P.C.

(57) ABSTRACT

A power tool, in particular an angle grinder, having a drive motor accommodated in a housing which drives a rotor shaft, a tool spindle comprising a tool holder which is preferentially connected to the rotor shaft in a power-transmitting manner by a gearing, as well as a control switch for activating the drive motor, wherein the control switch comprises a first switching element which is pivotably mounted on the housing about a pivot axis between a first switch position for switching on the drive motor and a second switch position for switching off the drive motor, and a second switching element which is rotatable about a rotational axis between a locked position which blocks the first switching element from moving into the first switch position and a release position which enables the first switching element to move into the first switch position.

21 Claims, 7 Drawing Sheets

(56) References Cited

U.S. PATENT DOCUMENTS

2014/0349556 A1\* 11/2014 Zhang ..................... B25F 5/02
                                                                                                         451/359
2020/0094373 A1\* 3/2020 Luescher ................. B25F 5/00
2020/0189066 A1\* 6/2020 Qu .................... B23Q 11/0092

FOREIGN PATENT DOCUMENTS

DE      102011089722     6/2013
DE      102011089724     6/2013
EP        2548698 A2 \*  1/2013   ......... B23Q 11/0092

\* cited by examiner

POWER TOOL

CROSS-REFERENCE TO RELATED APPLICATION

This application claims the benefit of German Patent Application No. 20 2020 103 534.7 filed Jun. 18, 2020, the entire contents of which are incorporated herein by reference in its entirety.

FIELD

The invention relates to a power tool, in particular an angle grinder, having a drive motor accommodated in a housing which drives a rotor shaft, a tool spindle comprising a tool holder which is preferentially connected to the rotor shaft in a power-transmitting manner by a gearing, as well as a control switch for activating the drive motor.

BACKGROUND

In the case of some power tools, as for example with angle grinders, it needs to be ensured that two separate and different user actions are required in order to activate the drive motor. This is necessary so as to reduce the risk of the power tool being unintentionally switched on when being handled by the user. At the same time, the control switch is not to be designed such that it would be possible for the user to perform these two actions with just one grasping motion or rectilineal motion since this would also invite the risk of the user unintentionally switching on the power tool, which would likewise be associated with a not inconsiderable risk of injury.

A power tool of the initially specified type is known from DE 199 58 297 A1, in which the control switch for activating the drive motor is of multi-part design. To switch on the power tool known from the prior art, the individual parts of the control switch need to be displaced relative to each other, which mechanically necessitates a very complex structure. In addition, the solution known from the prior art only reduces the risk of unintentional activation of the power tool to a very limited extent such that the risk of the user unintentionally switching on the power tool still remains.

SUMMARY

The present invention is thus based on the task of providing an improved power tool which enables simplified and simultaneously safe operation of said power tool.

The invention solves this task with a power tool of the initially cited type in that the control switch comprises a first switching element which is pivotably mounted on the housing about a pivot axis between a first switch position for switching on the drive motor and a second switch position for switching off the drive motor, and a second switching element which is rotatable about a rotational axis between a locked position which blocks the first switching element from moving into the first switch position and a release position which enables the first switching element to move into the first switch position.

A very simple solution in mechanical terms is thereby provided with which it is possible to prevent activation of the drive motor if the second switching element is not first rotated about the rotational axis. Since the rotational motion provided by the user to move the second switching element from the locked position into the release position clearly differs from the pivoting motion which the user must then perform to move the first switching element from the second switch position into the first switch position, this thereby ensures a significant reduction in the risk of unintentional activation. At the same time, however, the user must deliberately perform both movements, and this can be done with just one hand while the other hand remains on the additional hand grip.

It has also shown to be advantageous here for the pivot axis of the first switching element to be oriented perpendicular to the longitudinal axis of the rotor shaft. This can thereby achieve the user being able to move the first switching element in particularly simple manner. The user can thus simply grasp the first switching element with the palm of his hand and displace it.

Also having proven particularly advantageous is for the rotational axis to be oriented perpendicular to the pivot axis and for the angle between the rotational axis and the rotor shaft longitudinal axis to be 70° or more, preferentially 80° or more, and particularly preferentially 85° or more, and further preferably 110° or less, preferentially 100° or less, and particularly preferentially 95° or less, and most particularly preferentially 90°. This thereby likewise reduces the risk of the user accidentally activating the power tool. In particular, the perpendicular orientation of the pivot axis and the rotational axis is thereby of advantage. These angle specifications thereby relate to the activated state, thus when the first switching element is in the first switch position.

A particularly simple mounting can also be achieved by the second switching element being rotatably mounted on the first switching element. This can thereby in particular do away with the need for complex mounting of the second switching element on the housing. In addition, it also offers the advantage of the two switching elements then only moving relative to one another when the second switching element is shifted between the locked position and the release position.

Also having proven effective in this context is for the angle between the rotational axis and the rotor shaft longitudinal axis to change between the first switch position and the second switch position. Thus, the angle between the rotational axis and the rotor shaft longitudinal axis can be greater in the first position or in the second position of the first switching element than in the other position. Thereby in particular provided is for the angle to change within an angular range of less than 40°, preferentially less than 30°, and particularly preferentially less than 10°.

A safe differentiating of the activating motion can thereby also be achieved by the angular deflection of the second switching element between the locked position and the release position being 10° or more, preferentially 20° or more, and further preferably 45° or less, preferentially 30° or less, and most particularly preferentially 22.5°. Selecting an angle which is too small increases the risk of unintentional activation of the power tool. In contrast, selecting an angle which is too large gives rise to the problem of complicating operation for the user.

Also having proven particularly advantageous is for at least one limit stop for limiting the rotation of the second switching element to be formed on the first switching element and/or on the housing. This thereby achieves a defined end position for the second switching element. Also having proven advantageous in this context is for the at least one limit stop to define the release position. The user can thereby switch on the power tool particularly easily and quickly since he only needs to rotate the second switching element up to the limit stop.

In order to even further improve user handling, it has moreover proven advantageous to provide more than one limit stop, preferably two. This thereby gives the user the opportunity to move the second switching element either to the one limit stop or to the other limit stop in order to convey the second switching element from the locked position into the release position. So doing enables for example left-handed users to operate the control switch just as easily as right-handed users.

Also having shown to be advantageous is for at least one arcuate passage to be formed in the first switching element through which at least part of the second switching element passes. Most of the second switching element is thereby covered by the first switching element and at the same time also protected. Moreover, passage can be limited by the limit stops defining the release position.

It has thereby further proven advantageous for the arcuate passage to span an angular range of 15° or more, preferentially 25° or more, and particularly preferentially 35° or more, and further preferably 75° or less, preferentially 65° or less, and particularly preferentially 55° or less, and most particularly preferentially 45°.

Furthermore proven effective is for at least one locking contour to be formed on the housing which interacts with the second switching element such that in the locked position of the second switching element, the first switching element is locked in the second switch position. This enables easily ensuring that the first switching element cannot be moved into the first position when the second switching element is still in the locked position.

Having proven advantageous in this context is allocating at least one counter-stop to the second switching element. In one particularly preferential embodiment, this at least one counter-stop can thereby be of pin-like design. Preferentially the counter-stop is oriented parallel to the rotational axis.

Also having been shown to be advantageous is for at least one recess to be formed on the second switching element into which the locking contour engages in the first switch position of the first switching element, whereby the locking contour is preferentially designed as a locking cross-piece. Thereby also provided in the context of the invention is to provide for more than one recess, in particular four. In addition, the recess can be formed adjacent to the at least one counter-stop. The recesses into which the locking contours engage achieves the second switching element being supported on the housing when in the release position when the first switching element is in the first position.

Moreover having proven advantageous for operational safety is the providing of a return spring which loads the second switching element in the direction of the locked position. Thereby in particular able to be achieved is the second switching element always being automatically conveyed from the release position to the locked position, whereby unintentional restarting of the power tool is prevented once the user releases the control switch again. In other words, this means that the return force of the return spring conveys the second switching element back into the locked position. In particular, the first switching element can also be loaded in the direction of the second switch position by a return member. This then causes the first switching element to be moved back into the second position by the return member and the second switching element to be moved back into the locked position by the return spring. This also has the effect of the drive motor being turned off again, whereby operational safety is increased as unintentional activating of the power tool can be prevented.

Also having been shown to be particularly advantageous is for the return spring to be formed as a leg spring, its limbs received on the first switching element and on the second switching element. This thereby enables ensuring that the spring is particularly well protected against external influences. What the leg spring thereby achieves is said leg spring being tensioned when the second switching element is rotated from the locked position into the release position. Upon the second switching element then being released again, it is then automatically conveyed back into the locked position by the tensioned leg spring.

BRIEF DESCRIPTION OF THE DRAWINGS

The invention is explained in greater detail below using an exemplary embodiment depicted in the drawings, which show.

DETAILED DESCRIPTION

Figure 1:
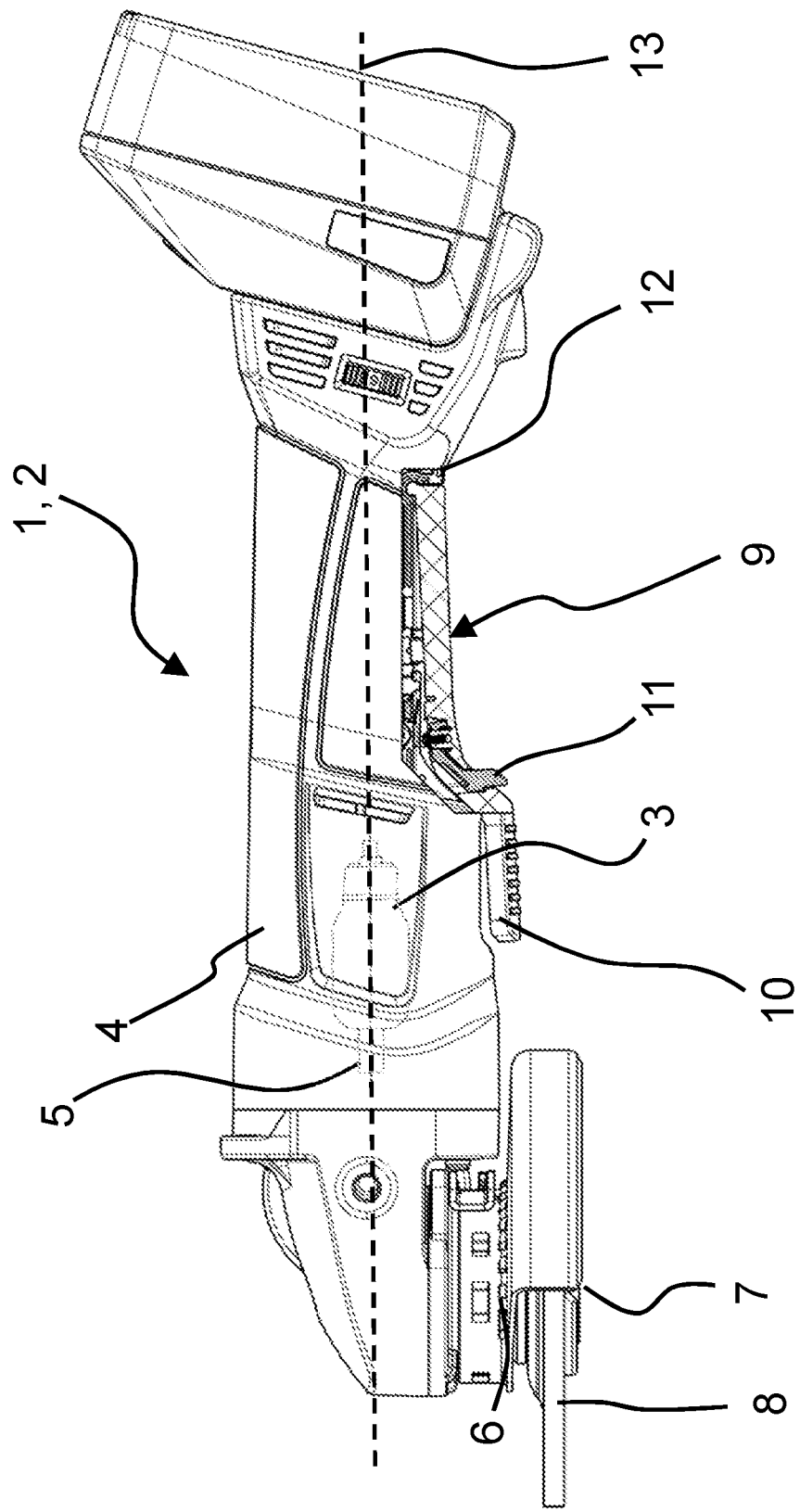
FIG. 1 a partially sectioned side view of a power tool,
FIG. 2 a top view of a detail of the power tool,
FIG. 3 an exploded view of a control switch,
FIG. 4 a top view of a first switching element of the control switch,
FIG. 5 a perspective view of a second embodiment of a second switching element,
FIG. 6 a perspective view of the second embodiment of the second switching element in a locked position, and
FIG. 7 a perspective view of the second embodiment of the second switching element in a release position.

FIG. 1 shows a power tool 1, namely an angle grinder 2, in side view. It comprises a schematically depicted drive motor 3 which is accommodated in a housing 4. The drive motor 3 thereby drives a rotor shaft 5 which is connected to a tool spindle 6 in power-transmitting manner by a gearing. On the tool spindle 6 itself, a grinding wheel 8 is fixed to a tool holder 7, which serves in the machining of workpieces by the user and who can replace same if needed. A control switch 9 is disposed on the housing 4 for switching the drive motor 3 on and off.

Figure 2:
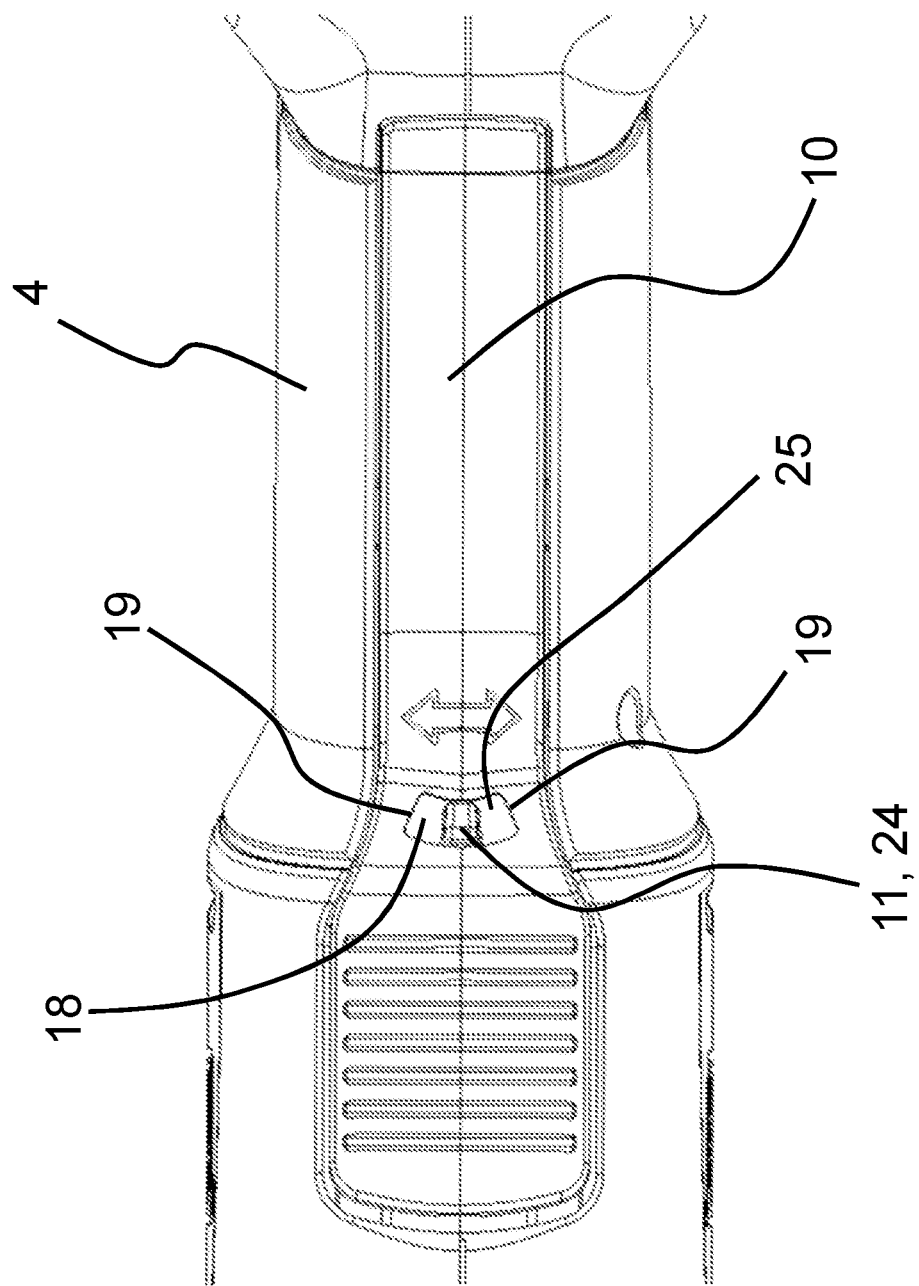

As can be seen in particular from FIG. 2, the control switch 9 is thereby of multi-part design and comprises a first switching element 10 and a second switching element 11. The first switching element 10 is pivotably mounted on the housing 4 about a pivot axis 12 between a first and a second switch position. The pivot axis 12 of the first switching element 10 is thereby oriented perpendicular to the rotor shaft longitudinal axis 13. The drive motor 3 is activated when the user moves the first switching element 10 into the first switch position while the drive motor 3 is deactivated in the second switch position. However, it is only possible to move the first switching element 10 from the second position into the first position to activate the drive motor 3 when the second switching element 11 is first rotated about a rotational axis 14 from a locked position into a release position. When the second switching element 11 is in the locked position, the first switching element 10 is thereby namely blocked from moving from the second switch position into the first switch position and the activation of the drive motor 3 is thus blocked. If the user wants to move the first switching element 10 from the second switch position into the first switch position, the surface of the counter-stop 22 of the second switching element 11 comes to bear on the locking cross-piece 21 parallel to the upper surface of same. Not until the user moves the second switching element 11 from the locked position into the release position is it possible for him to pivot the first switching element 10 into the first switch position in order to thus activate the drive motor 3.

Figure 3:
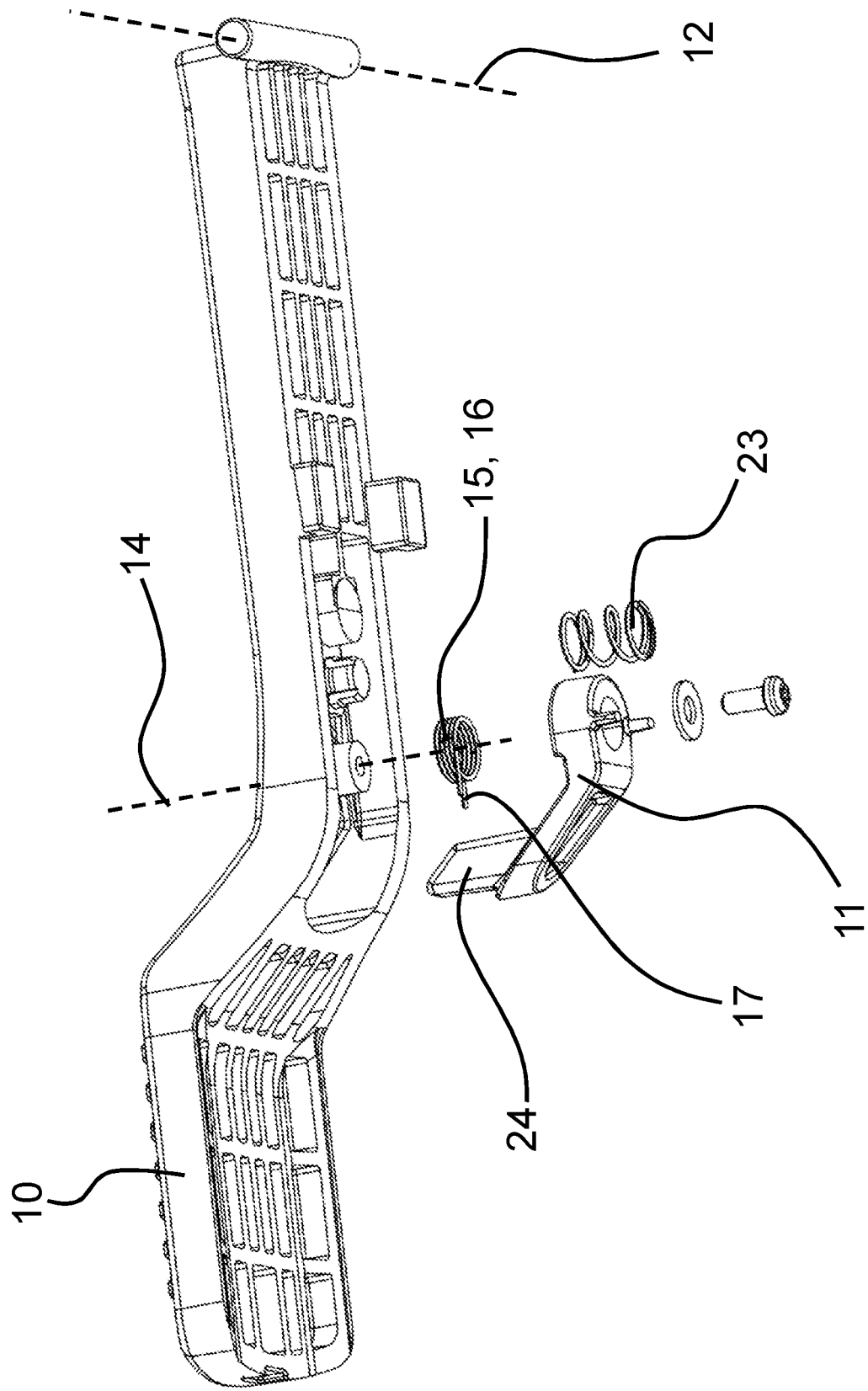

As can be seen in particular from the exploded view of the control switch 9 depicted in FIG. 3, the second switching element 11 is rotatably mounted on the first switching element 10, wherein a return spring 15, which is formed as a leg spring 16 in the depicted exemplary embodiment, is arranged between the first switching element 10 and the second switching element 11. The leg spring 16 loads the second switching element 11 in the direction of the locked position. The limbs 17 of the leg spring 16 are received on the first switching element 10 and on the second switching element 11. Thus, if the second switching element 11 is conveyed from the locked position into the release position, the return force of the leg spring 16 acts on the second switching element 11 to move the second switching element 11 back into the locked position. It can also be seen from FIG. 3 that the rotational axis 14 of the second switching element 11 is oriented perpendicular to the pivot axis 12 of the first switching element 10. Since the second switching element 11 is rotatably affixed to the first switching element 10, however, the angle between the rotational axis 14 and the rotor shaft longitudinal axis 13 is not constant but instead differs according to whether the first switching element 10 is in the first switch position or in the second switch position. In the depicted exemplary embodiment, the angle between the rotational axis 14 and the rotor shaft longitudinal axis 13 is between 80° and 100°. A return member 23 can also be seen in FIG. 3, same being arranged between the housing 4 and the first switching element 10 and which loads the first switching element 10 in the direction of the second position.

Figure 4:
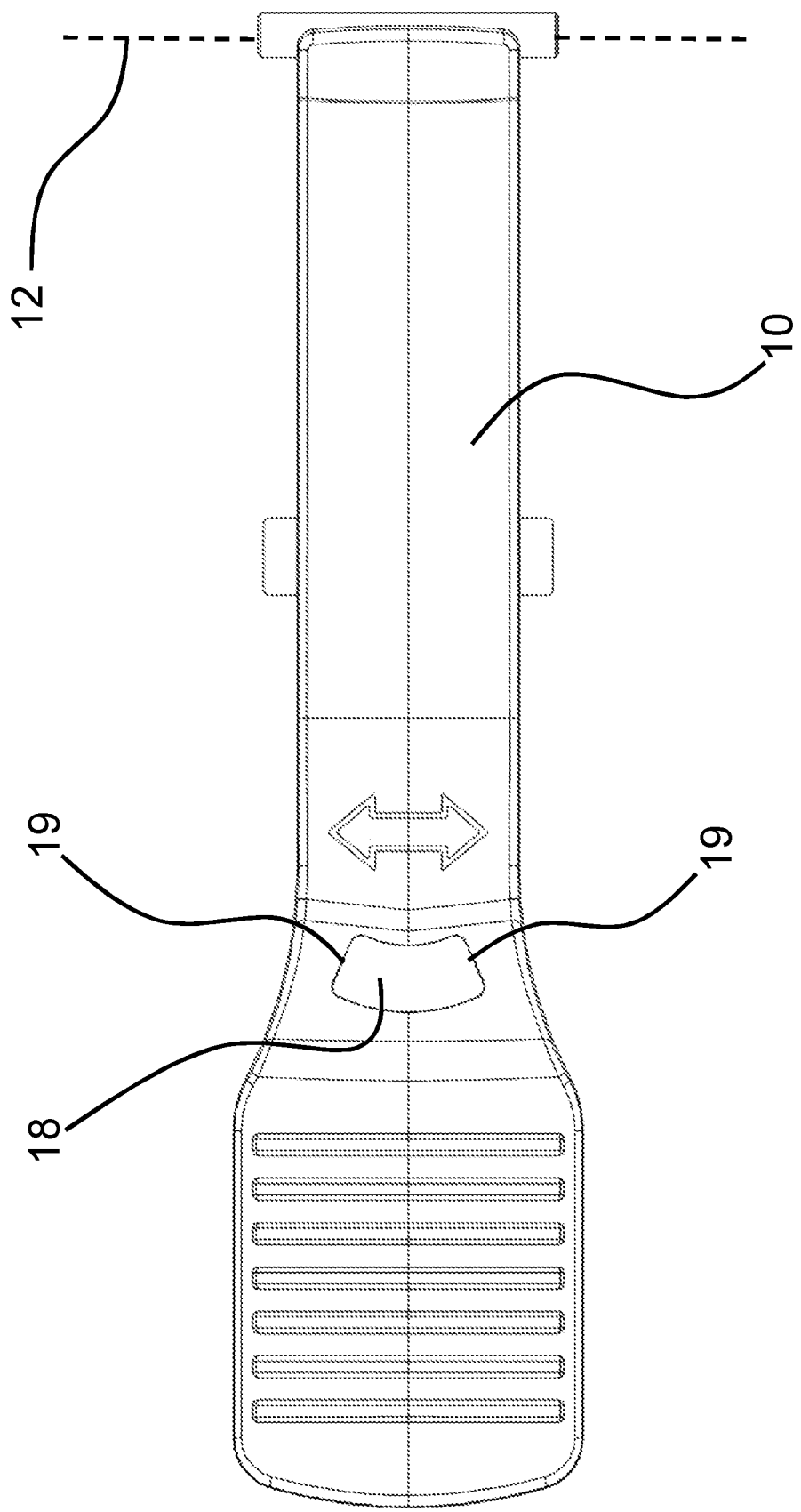

It can be seen from the top view of the first switching element 10 depicted in FIG. 4 that at least one arcuate passage 18 is formed on the first switching element 10 through which at least part of the second switching element 11 with a handle section 24 passes in order to enable the user to rotate the second switching element 11 between the locked position and the release position. The arcuate passage 18 thereby spans an angular range which in the exemplary embodiment is around 45°. The passage 18 is thereby delimited by two limit stops 19 which at the same time define the release position of the second switching element 11. When positioned midway between the two limit stops 19, the second switching element 11 is then in the locked position, said second switching element 11 also being acted upon again by the leg spring 16 in this position. The angular deflection of the second switching element 11 between the locked position and the release position therefore amounts to around 22.5° in the exemplary embodiment as shown. When the second switching element 11 is mounted on the first switching element 10, the second switching element 11 thus covers the passage 18 formed on the first switching element 10 so as to prevent the ingress of contaminants. Provided to that end within the scope of the invention is the affixing of a rib 25 to the second switching element 11, same being firmly attached to the second switching element 11, and thus the covering or respectively closing of the passage 18 formed in the first switching element 10 from the inside.

Figure 5:
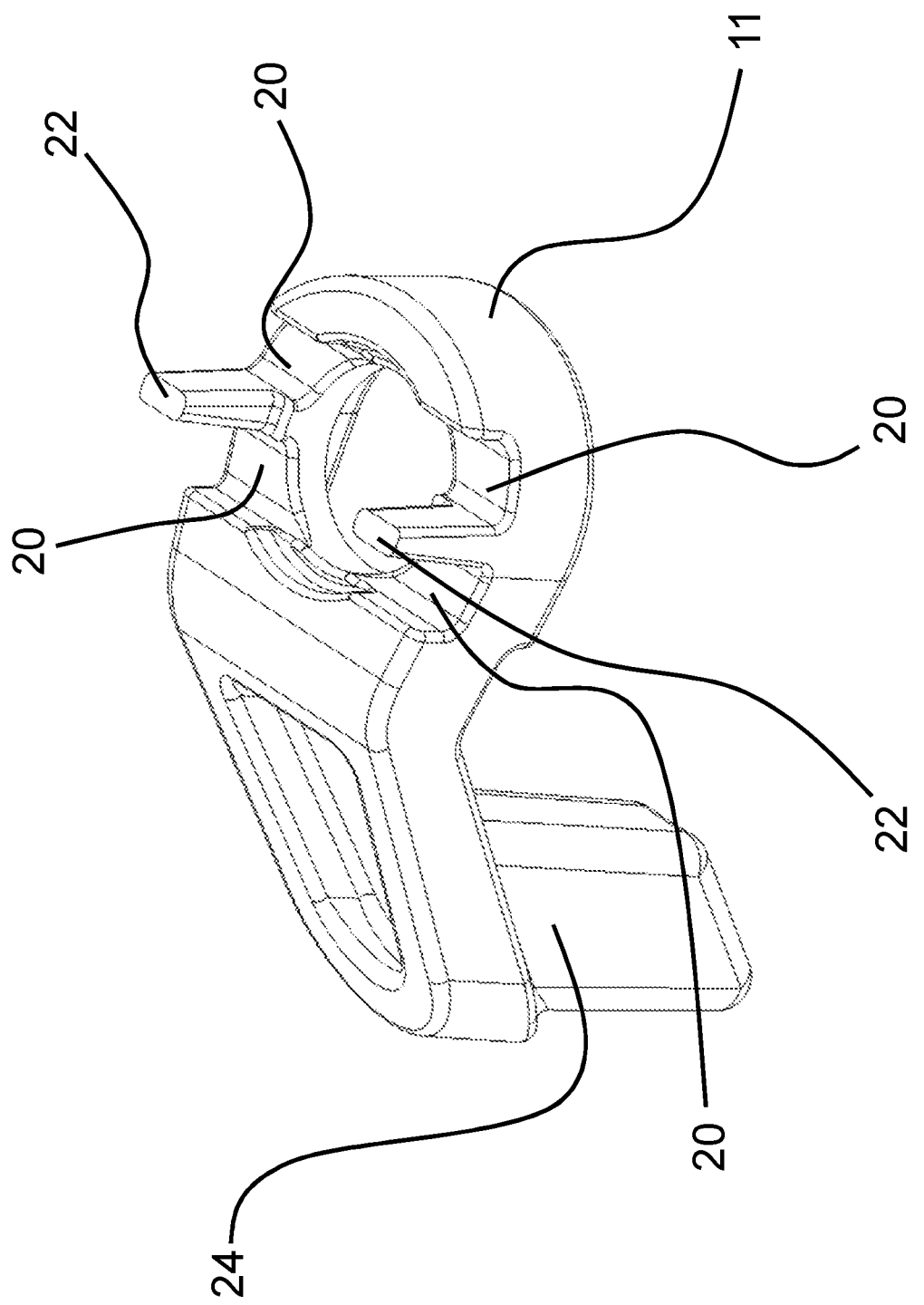

FIG. 5 shows a second embodiment of the second switching element 11. This thereby differs from the first embodiment depicted in FIG. 3 in that recesses 20 are formed on the second switching element 11 into which a locking cross-piece 21 engages in the first switch position of the first switching element 10. A total of four such recesses 20 are provided in the depicted exemplary embodiment. Furthermore to be seen from FIG. 5 is that the second switching element 11 is allocated at least two counter-stops 22 which likewise interact with the locking cross-piece 21, as will be explained below with reference to FIG. 6. The recesses 20 are thereby formed adjacent to the counter-stops 22, which takes into account the fact that the second switching element 11 can be rotated into the release position in two different directions.

Figure 6:
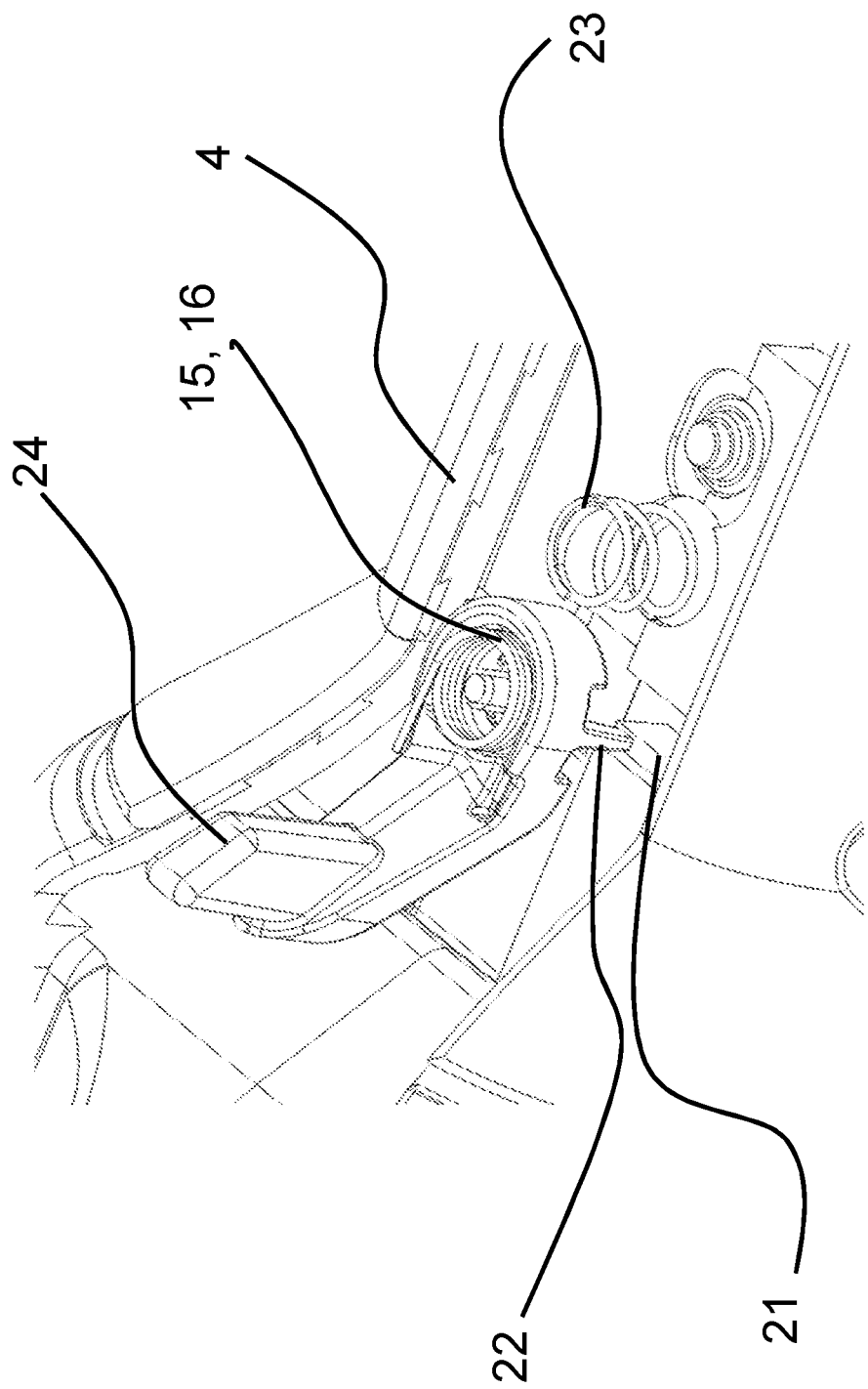

FIG. 6 shows the control switch 9 mounted on the housing 4; the first switching element 10 not being depicted therein for reasons of clarity. As can be seen from this figure, the locking cross-pieces 21 are formed on the housing 4. They interact with the counter-stops 22, which are formed on the second switching element 11, to prevent a pivoting of the first switching element 10 about pivot axis 12 in the locked position since the counter-stops 22 of the second switching element 11 then act upon the locking cross-pieces 21 and prevent the first switching element 10 from moving into the first position.

Figure 7:
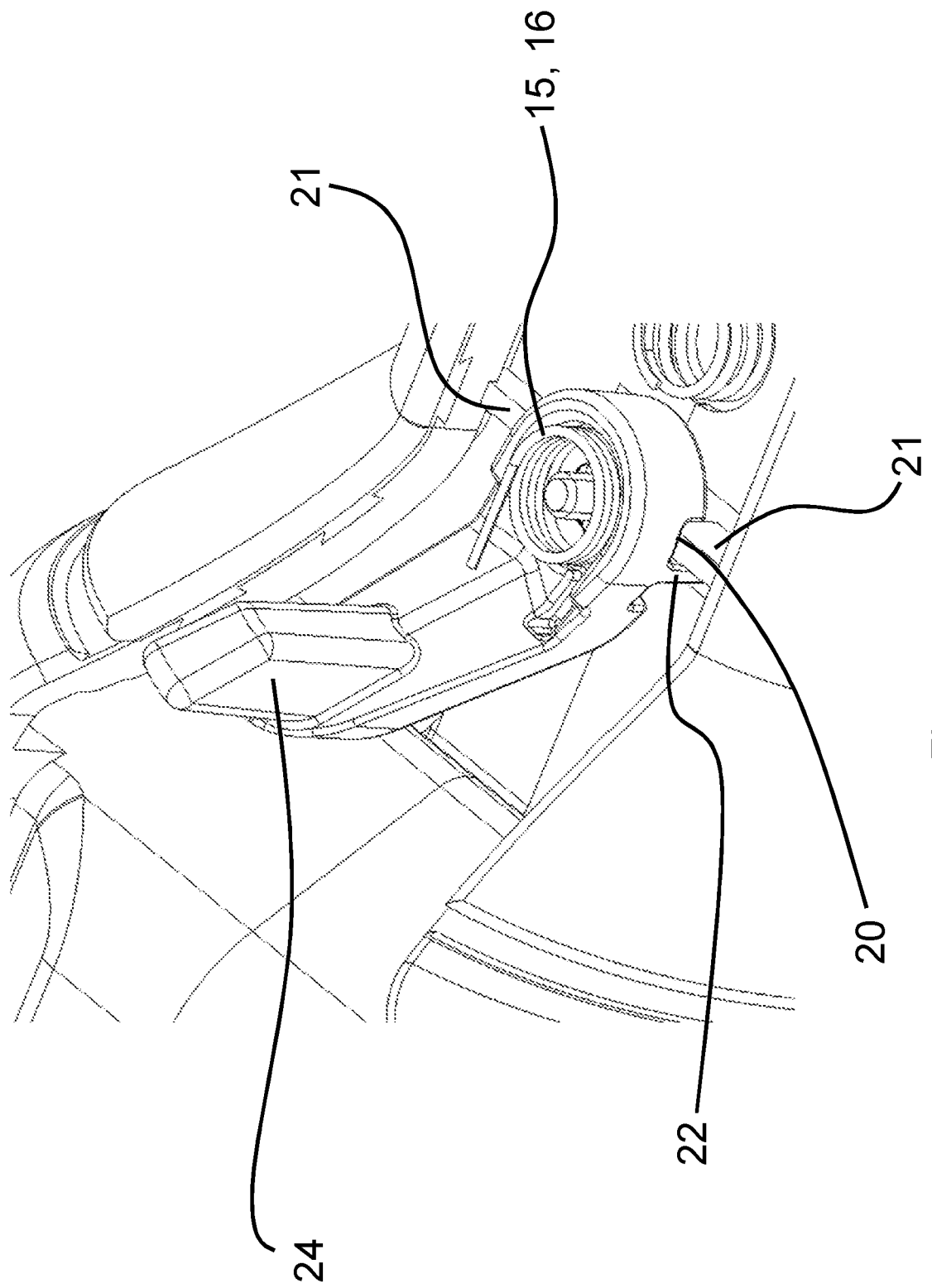

Not until the second switching element 11 is rotated about the rotational axis 14 from the locked position into the release position is it then possible to pivot the first switching element 10 of the control switch 9 from the second position into the first position as depicted in FIG. 7. The recesses 20 formed on the side of the counter-stops 22 thereby engage into the locking cross-pieces 21 formed on the housing 4.

LIST OF REFERENCE NUMERALS 1 power tool
2 angle grinder
3 drive motor
4 housing
5 rotor shaft
6 tool spindle
7 tool holder
8 grinding wheel
9 control switch
10 first switching element
11 second switching element
12 pivot axis
13 rotor shaft longitudinal axis
14 rotational axis
15 return spring
16 leg spring
17 limb
18 passage
19 limit stop
20 recesses
21 locking cross-piece
22 counter-stop
23 return member
24 handle section
25 rib

What is claimed is:

1. An angle grinder, comprising:
a drive motor accommodated in a housing which drives a rotor shaft;
a tool spindle comprising a tool holder as well as a control switch for activating the drive motor, wherein the control switch comprises:
a first switching element which is pivotably mounted on the housing about a pivot axis between a first switch position for switching on the drive motor and a second switch position for switching off the drive motor; and
a second switching element which is rotatable about a rotational axis between a locked position which blocks the first switching element from moving into the first switch position and a release position which enables the first switching element to move into the first switch position;

at least one locking contour formed on the housing which interacts with the second switching element such that in the locked position of the second switching element, the first switching element is locked in the second switch position; and two recesses formed on the second switching element into which the at least one contour engages in the first switch position of the first switching element, wherein each recess of the two recesses is arranged adjacent to a respective long side of a counter-stop formed on the second switching element; and wherein the rotational axis of the second switching element is oriented perpendicular to the pivot axis of the first switching element, and wherein an angle between the rotational axis of the second switching element and a longitudinal axis of the rotor shaft amounts to 70° or more and 110° or less, wherein the second switching element is rotatably mounted on the first switching element, and wherein at least one arcuate passage is formed in the first switching element through which at least part of the second switching element passes.

2. The angle grinder according to claim 1, wherein the pivot axis of the first switching element is oriented perpendicular to the longitudinal axis of the rotor shaft.

3. The angle grinder according to claim 1, wherein the angle between the rotational axis and the longitudinal axis amounts to 85° or more and 95° or less.

4. The angle grinder according to claim 1, wherein the angle between the rotational axis and the longitudinal axis of the rotor shaft changes between the first switch position and the second switch position.

5. The angle grinder according to claim 1, wherein an angular deflection of the second switching element between the locked position and the release position amounts to 10° or more and 45° or less.

6. The angle grinder according to claim 1, wherein at least one limit stop for limiting the rotation of the second switching element is formed on the first switching element and/or on the housing.

7. The angle grinder according to claim 6, wherein the at least one limit stop defines the release position.

8. The angle grinder according to claim 6, wherein the at least one limit stop comprises more than one stop.

9. The angle grinder according to claim 1, wherein the first switching element comprises a first end at which the first switching element is mounted on the housing and a second end, wherein the rotational axis extends through the first switching element between the first end and the second end, and wherein the at least one arcuate passage is formed in the first switching element between the second end and a portion of the first switching element through which the rotational axis extends.

10. The angle grinder according to claim 1, wherein the at least one arcuate passage spans an angular range of 15° or more and 75° or less.

11. The angle grinder according to claim 1, wherein the second switching element includes an additional counter-stop formed on the second switching element and two additional recesses formed on the second switching element, wherein each recess of the two additional recesses is arranged adjacent to a respective long side of the additional counter-stop.

12. The angle grinder according to claim 1, wherein a return spring is provided which loads the second switching element in a direction of the locked position.

13. The angle grinder according to claim 12, wherein the return spring is formed as a leg spring, wherein limbs of the leg spring are received on the first switching element and on the second switching element.

14. The angle grinder of claim 1, wherein the tool spindle is connected to the rotor shaft in a power-transmitting manner by a gearing.

15. The angle grinder of claim 1, wherein the at least one locking contour is designed as a locking cross-piece.

16. The angle grinder according to claim 1, wherein the angle between the rotational axis and the longitudinal axis of the rotor shaft is 90°.

17. The angle grinder according to claim 1, wherein an angular deflection of the second switching element between the locked position and the release position amounts to 30° or less.

18. The angle grinder according to claim 1, wherein an angular deflection of the second switching element between the locked position and the release position amounts to 22.5°.

19. The angle grinder according to claim 1, wherein the at least one arcuate passage spans an angular range of 45°.

20. An angle grinder, comprising:

a drive motor accommodated in a housing which drives a rotor shaft;

a tool spindle comprising a toolholder as well as a control switch for activating the drive motor, wherein the control switch comprises:

a first switching element which is pivotably mounted on the housing about a pivot axis between a first switch position for switching on the drive motor and a second switch position for switching off the drive motor; and a second switching element which is rotatable about a rotational axis between a locked position which blocks the first switching element from moving into the first switch position and a release position which enables the first switching element to move into the first switch position;

at least one locking contour formed on the housing which interacts with the second switching element such that in the locked position of the second switching element, the first switching element is locked in the second switch position; and two recesses formed on the second switching element into which the at least one locking contour engages in the first switch position of the first switching element, wherein each recess of the two recesses is arranged adjacent to a respective long side of a counter-stop formed on the second switching element, wherein the rotational axis of the second switching element is oriented perpendicular to the pivot axis of the first switching element, wherein an angle between the rotational axis of the second switching element and a longitudinal axis of the rotor shaft amounts to 70° or more and 110° or less, wherein a movement of the second switching element when rotated about the rotational axis is along a surface of the housing, wherein the second switching element is rotatably mounted on the first switching element, and wherein at least one arcuate passage is formed in the first switching element through which at least part of the second switching element passes.

21. An angle grinder, comprising:
a drive motor accommodated in a housing which drives a rotor shaft;
a tool spindle comprising a toolholder as well as a control switch for activating the drive motor, wherein the control switch comprises:
a first switching element which is pivotably mounted on the housing about a pivot axis between a first switch position for switching on the drive motor and a second switch position for switching off the drive motor; and
a second switching element which is rotatable about a rotational axis between a locked position which blocks the first switching element from moving into the first switch position and a release position which enables the first switching element to move into the first switch position;
at least one locking contour formed on the housing which interacts with the second switching element such that in the locked position of the second switching element, the first switching element is locked in the second switch position;
two counter-stops formed on and being positioned at opposite sides of the second switching element; and
two recesses formed on the second switching element into which the at least one locking contour engages in the first switch position of the first switching element, wherein each recess of the two recesses is arranged adjacent to a respective long side of one of the two counter-stops formed on the second switching element;
wherein the rotational axis of the second switching element is oriented perpendicular to the pivot axis of the first switching element, and wherein an angle between the rotational axis of the second switching element and a longitudinal axis of the rotor shaft amounts to 70° or more and 110° or less,
wherein the second switching element is rotatably mounted on the first switching element, and
wherein at least one arcuate passage is formed in the first switching element through which at least part of the second switching element passes.

* * * * *